UNITED STATES PATENT OFFICE 2,194,938

PROCESS FOR THE MANUFACTURE OF BENZIDINE

Clyde O. Henke, Wilmington, Del., and Roland G. Benner, Carneys Point, N. J., assignors to E. I. du Pont de Nemours & Company, Wilmington, Del., a corporation of Delaware No Drawing. Application April 23, 1938, Serial No. 203,814

14 Claims. (Cl. 260—580)

This invention relates to a process for the catalytic hydrogenation of nitrobenzene and more particularly to the production of benzidine.

This invention has as an object an improved and economical process for the production of benzidine. Another object is the production of benzidine sulfate or hydrochloride relatively free of isomers of benzidine and aniline. Another object is to provide an improved process for the hydrogenation of nitro benzene to hydrazobenzene. Still another object is the conversion of azobenzene to hydrazobenzene. Another object is the separation of aniline hydrochloride from a solution containing benzidine hydrochloride and aniline hydrochloride. Other objects will appear hereinafter.

These objects are accomplished by the following process which may be outlined by the following steps:

(1) Hydrogenating nitrobenzene in the liquid phase under practical operating conditions which are suitable for the forming of, predominantly, azobenzene;

(2) Hydrogenating further the product formed at a lower temperature suitable for the reduction of most of the azobenzene to hydrazobenzene and unsuitable for the formation of aniline;

(3) Transforming the hydrazobenzene to benzidine hydrochloride by treatment with hydrochloric acid and converting any azobenzene to benzidine hydrochloride by the addition of iron to the inversion mass.

More specifically, the process is carried out by reducing nitrobenzene at a temperature above 125° C. and at an elevated pressure in the presence of a nickel catalyst and an alkaline compound. After the nitrobenzene has been completely hydrogenated, a product consisting of hydrazobenzene, azobenzene and aniline is obtained. The azobenzene is then hydrogenated at temperatures below 120° C. in order to convert same to hydrazobenzene without the formation of undue amounts of aniline. The hydrazobenzene is inverted to benzidine hydrochloride by treatment with hydrochloric acid and any azobenzene present is converted to benzidine hydrochloride by further reduction with iron and hydrochloric acid. Crude benzidine hydrochloride may be recovered by "salting out" and filtering from the solution of aniline hydrochloride. Benzidine relatively free of isomers of benzidine and aniline may be obtained by redissolving the crude product and filtering the solution to remove unreacted iron, the benzidine being isolated in the filtrate as the hydrochloride by the addition of salt or as the sulfate by the addition of sulfuric acid or sodium sulfate.

The following example constitutes a specific illustration of the invention described herein. This illustration is not intended to limit the invention in any respect, since many modifications may be made without departing from the spirit and scope of said invention.

Example

In an autoclave equipped for rapid agitation are charged 100 parts nitrobenzene (prepared by nitrating thiophene-free benzene), 1 part nickel catalyst (containing about 25 to 30% reduced nickel supported on kieselguhr), and 0.2 part caustic soda dissolved in 8 parts water. The nitrobenzene is hydrogenated at 145° to 150° C. and at hydrogen pressures of 100 to 200 lbs. per sq. in. After about 25% of the theoretical amount of hydrogen required to form azobenzene has been absorbed, 0.06 part caustic soda in 0.6 part of water is added to the reduction mass during the hydrogenation. Similar additions of caustic soda are also made after 35%, 45%, 60%, 75%, 85% and 95% of the theoretical amounts of hydrogen have been absorbed. After the last addition of caustic soda the hydrogenation is continued until all of the nitrobenzene has been reduced. This may be determined by treating a sample of the oil in the reduction mass with hot dilute hydrochloric acid. If the acid insoluble material has a freezing point of about 60° C., no appreciable amounts of nitrobenzene are present. The autoclave is then cooled to below 100° C. and 0.25 part more catalyst is added. The hydrogenation is continued at 75–85° C. and at 150 to 200 lbs. pressure until the rate of absorption of hydrogen decreases markedly.

The reduction mass with 30 parts of water is agitated in an acid resistant vessel while cooling to 0–10° C. over a period of 1 to 2 hours. While the temperature is maintained at 0–10° C., 250 parts of 15% hydrochloric acid is slowly added to convert the hydrazobenzene to benzidine hydro chloride and the aniline to aniline hydrochloride. After agitating the mixture for about 8 hours, one part of xylene is added and the temperature is allowed to rise to 20° to 30° C. after which 15 parts of iron powder is added in portions over a period of about 8 hours. After half of the iron is added 45 parts 15% hydrochloric acid is also added. The agitation is then continued until the mass loses its reddish color and becomes grey which requires about 8 hours. The mass contains aniline hydrochloride and benzidine hydrochloride which is "salted out" by the addition of 50 parts salt and filtered at 15° to 20° C. from the solution of aniline hydrochloride. The filter cake of benzidine hydrochloride is washed with 100 parts of 15% salt solution to completely remove the aniline which is recovered by steam distillation of the filtrate after making it alkaline. The filter cake of crude benzidine hydrochloride is dissolved in water, the solution filtered to remove unreacted iron, and the benzidine in the filtrate precipitated as the sulfate by the addition of sulfuric acid or as the hydrochloride by the addition of salt. The hydrochloride may be isolated by filtering and washing with salt solution while the sulfate may be isolated by filtering and washing with water. Benzidine base prepared from either the sulfate or the hydrochloride has a freezing point of 127° to 128° C.

The yield of benzidine sulfate or hydrochloride is 50 to 60% of the theoretical yield based on nitrobenzene and the yield of aniline is 30 to 40% of the theoretical yield, the total being 85 to 90% of the theoretical yield.

Other methods for recovering aniline from the azo-hydrazo-benzene may be employed. For instance, the charge in the autoclave after the second reduction step may be filtered to remove catalyst, and the oil layer in the filtrate separated from the aqueous layer after the addition of salt to "salt out" dissolved aniline. The aqueous layer may be discarded and the oil layer distilled under vacuum to remove aniline. A sufficiently high vacuum should be maintained during the distillation so that the temperature in the still does not rise above 120° C. At the end of the distillation steam may be passed through the residue of azo-hydrazo-benzene to completely remove the aniline. The mixture of azo-hydrazo-benzene can then be converted to benzidine hydrochloride with iron and hydrochloric acid as described in the above example.

This invention is not limited to the particular conditions described in the above example. During the first reduction step when nitrobenzene is reduced principally to azobenzene temperatures of 125° to 175° C. and hydrogen pressures of 50 to 300 lbs. per sq. in. may be employed. The preferred temperatures are 140° to 150° C. and the preferred pressures are 100 to 200 lbs. per sq. in.

Various amounts of caustic soda and other alkaline substances, water and catalyst may be used. For example, caustic soda in amounts of 0.2 to 5.0% of the weight of nitrobenzene may be used. Various amounts may be added to the nitrobenzene and various amounts may be added to the reduction mass during the hydrogenation. It is advantageous to add the caustic soda in portions during the reduction, because less catalyst is required than by the addition of the same amount of caustic soda at the start. Thus, if 0.7% of caustic soda is charged with the nitrobenzene instead of 0.2%, as in the above example, the reduction is slower and more catalyst is required. Even with three times this amount of catalyst the initial reaction is exceedingly slow. The preferred initial amounts of caustic soda are 0.1 to 0.4% of the weight of the nitrobenzene and the preferred total amounts of caustic soda are 0.5 to 1.0%, but as much as 5.0% may be used.

Other alkaline substances such as potassium hydroxide, trisodium phosphate, sodium carbonate, sodium silicate, etc., may be used in place of caustic soda. The type of alkaline compound does not appear to be important. However, sufficient quantities should be used to impart to the initial charge a pH of above 10.0.

The amount of catalyst may be varied considerably. In the above example 1.25% is used. With this amount of an active nickel catalyst the reduction requires 8 to 12 hours. With less catalyst the time of reaction is longer, and with more catalyst the time is decreased. However, when the nickel in the catalyst becomes more than 5.0% of the weight of nitrobenzene, the amount becomes excessive and difficulties of removal, separation and handling appear. Active nickel containing catalysts, well known to the art, whether supported or not, may be used. An active nickel catalyst prepared by precipitation of nickel on kieselguhr from a solution of nickel nitrate with a carbonate precipitant followed by reduction with hydrogen at elevated temperatures as described in U. S. Patent application Serial No. 11,952, is satisfactory.

The amount of water which is charged with the caustic soda is not critical, but should be less than 1.5 times the weight of nitrobenzene. Larger quantities of water make the recovery of aniline difficult and expensive.

In the second reduction step when most of the azobenzene formed in the first hydrogenation step is reduced to hydrazobenzene with hydrogen, temperatures of 50° to 120° C. and pressures above 50 lbs. per sq. in. may be used. The preferred temperatures and pressure are 75-100° C. and 100 to 300 lbs. per sq. in., respectively. At lower temperatures and pressures the reaction is considerably slower. At higher temperatures and pressures slightly lower yields of benzidine are obtained due to the formation of more aniline. At temperatures above 120° C., however, excessive quantities of aniline are formed. The reduction becomes slow after most of the azobenzene has been reduced to hydrazobenzene and the remainder of the azobenzene is reduced with iron after the hydrazobenzene has been converted to benzidine hydrochloride by agitation with hydrochloric acid solution. If the reduction with hydrogen is continued in order to reduce all of the azobenzene to hydrazobenzene some hydrazobenzene reduces further to aniline. For this reason it is preferred to interrupt the reduction after the azobenzene content of the oil layer in the reduction mass has been decreased to about 15 to 25%, and then reduce the remainder of the azobenzene with iron and hydrochloric acid.

If the azobenzene content in the oil layer is above 40% after the second reduction step it is difficult to convert the azobenzene to benzidine hydrochloride with iron and hydrochloric acid without the use of large amounts of solvents. The reduction is, therefore, continued until the azobenzene content of the oily layer is about 5 to 40% and preferably 15 to 25%.

By hydrogenation, as previously described, the product after the first reduction step contains about 50 to 60% azobenzene, 5 to 10% hyrazobenzene and about 35% aniline, the yield of azo-hydrazo-benzene being about 60 to 65%. In the second reduction step azobenzene is reduced to hydrazobenzene without appreciably lowering the yield of azo-hydrazo-benzene. If the azobenzene content is reduced to about 20% of the remainder, the oil contains about 45% hydrazobenzene and about 35% aniline. By treating this mixture with hydrochloric acid very fine particles of azobenzene become suspended in the inversion mass as the hydrazobenzene is extracted from the mixed crystals of azo-hydrazo-benzene. These fine crystals can be converted to benzidine hydrochloride with iron and hydrochloric acid without the use of solvents although solvents such as xylene in the amounts of about 5 to 20% of the weight of the azobenzene promote a more rapid reaction. Since very small amounts of solvents are employed their recovery is not necessary. With azobenzene alone large amounts of solvents are required in order to obtain satisfactory yields of benzidine hydrochloride in a reasonable length of time by reduction with iron and hydrochloric acid.

Besides iron other metals in finely divided form such as zinc, tin, aluminum, etc., which liberate hydrogen in dilute hydrochloric acid solutions, may be used for conversion of the azo-hydrazobenzene to benzidine hydrochloride in hydrochloric acid. Iron is preferred for economic reasons.

During the conversion of the azo-hydrazo-benzene to benzidine hydrochloride, it is preferred to maintain the hydrochloric acid concentration in the inversion mass between 2 and 10% and the temperature at 5-35° C. Lower temperatures and acid concentration may be used by the reaction is slower. Higher acid concentrations, up to 15% hydrochloric acid, may also be used if it is desired to increase the rate of reaction. With still higher acid concentrations, however, the cost of the acid becomes excessive. Higher temperatures, up to 60° C., may be employed in order to increase the rate of the reaction. At still higher temperatures considerable hydrogen is evolved and difficulties with foaming are encountered.

By the above methods benzidine of exceptionally high purity is obtained more economically than by methods that have previously been used for its manufacture.

It is apparent that many widely different embodiments of this invention may be made without departing from the spirit and scope thereof and therefore it is not intended to be limited except as indicated in the appended claims.

We claim:

1. A process for the production of benzidine hydrochloride from nitrobenzene which comprises bringing nitrobenzene into contact with hydrogen in the presence of a nickel catalyst and an aqueous alkaline solution at a temperature between about 125° C. and about 175° C., said aqueous alkaline solution being maintained by the addition of the alkaline compound at intervals during the period of hydrogenation until the reaction mass is substantially free of nitrobenzene, then continuing the hydrogenation at a temperature between about 50° and about 120° C. until hydrogen absorption shows a marked decrease, adding to the resulting mixture hydrochloric acid and then adding a metal which will liberate hydrogen from the hydrochloric acid.

2. A process which comprises reacting nitrobenzene with hydrogen in the presence of a nickel catalyst and an aqueous alkaline solution at a temperature between about 125° C. and about 175° C. and at an elevated pressure between 50 and 300 lbs. per sq. in. and reacting the azobenzene formed with hydrogen at a temperature between about 50° C. and about 120° C.

3. A process for the production of benzidine hydrochloride which comprises reacting nitrobenzene with hydrogen in the presence of a nickel catalyst and an aqueous alkaline solution at a temperature between about 125° C. and about 175° C. and at an elevated pressure between 50 and 300 lbs. per sq. in., reacting the azobenzene formed with hydrogen at a temperature between about 50° C. an about 120° C. and treating the resulting mixture with hydrochloric acid and a metal which will liberate hydrogen from the hydrochloric acid.

4. A process which comprises bringing nitrobenzene and hydrogen into contact with a nickel catalyst and an aqueous alkaline solution at a temperature between 125 and 175° C. and at a pressure between 50 and 300 lbs. per sq. in. until substantially all the nitrobenzene is reduced, continuing the hydrogenation at a temperature between 50 and 120° C. and under a pressure in excess of 50 lbs. per sq. in., and, agitating the resulting product with powdered iron, water and hydrochloric acid until the azobenzene and hydrazobenzene have been transformed to bensidine hydrochloride.

5. A process in accordance with claim 4 characterized in that the first hydrogenation step is carried out at temperatures of about 140° C. to about 150° C. and at pressures of about 100 to about 200 lbs. per sq. in.

6. A process in accordance with claim 4 characterized in that the second hydrogen step is carried out at temperatures of about 75 to about 100° C. and at pressures of about 100 to about 300 lbs. per sq. in.

7. A process in accordance with claim 4 characterized in that the first hydrogenation step is carried out at temperatures of about 140° C. to about 150° C. and at pressures of about 100 to about 200 lbs. per sq. in. and that the second hydrogenation step is carried out at temperatures of about 75° to about 100° C. and at pressures of about 100 to about 300 lbs. per sq. in.

8. The process for the production of azobenzene and hydrazobenzene which comprises bring nitrobenzene into contact with hydrogen in the presence of a nickel catalyst and an aqueous alkaline solution at a temperature between about 125° C. and about 175° C., said aqueous alkaline solution being maintained by the addition of the alkaline compound at intervals during the period of hydrogenation.

9. The process in accordance with claim 8 characterized in that the alkali substance is sodium hydroxide and it is initially added in amounts equal to about 0.1% to 0.4% by weight of the nitrobenzene and then added at intervals during the hydrogenation until the reaction mass contains about 0.5% to 1.0% sodium hydroxide, said intervals being proportioned substantially equally over the period of hydrogenation.

10. In a process for the catalytic hydrogenation of nitrobenzene, the improvement which comprises carrying out the reaction in the presence of an inorganic alkaline compound, said alkaline compound being added at intervals during the period of hydrogenation.

11. In the process of catalytically hydrogenating nitrobenzene, the improvement which comprises carrying out the reaction in the presence of sodium hydroxide in a total amount equal to between about 0.2% and about 5.0% by weight of the nitrobenzene, said sodium hydroxide being added at intervals during the hydrogenation.

12. In the process of catalytically hydrogenating nitrobenzene, the improvement which comprises carrying out the reaction in the presence of sodium hydroxide, said sodium hydroxide being present at the start of the reaction in an amount equal to about 0.1% to about 0.4% by weight of the nitrobenzene and being added at intervals during the hydrogenation until the reaction mass contains about 0.5% to about 1.0% sodium hydroxide.

13. The process in accordance with claim 12 characterized in that said hydroxide is added at intervals which are proportioned substantially equally over the period of hydrogenation.

14. The process which comprises bringing nitrobenzene in contact with hydrogen in the presence of a nickel catalyst and in the presence of an aqueous solution of sodium hydroxide, said sodium hydroxide being in an amount equal to about 0.2% by weight of the nitrobenzene, at a temperature of about 130° C. to about 140° C. and at a pressure of about 100 to about 200 pounds per sq. in., adding sodium hydroxide at intervals during the hydrogenation in amounts equal to about 0.1% by weight of the nitrobenzene until the reaction mass contains about 0.7% sodium hydroxide, said intervals being proportioned substantially equally over the period of hydrogenation, continuing the hydrogenation until the reaction mass is substantially free of nitrobenzene and azoxybenzene.

CLYDE O. HENKE.
ROLAND G. BENNER.